March 4, 1969  M. DANGAUTHIER  3,431,035
FLEXIBLE BEARING IN PARTICULAR FOR AN AUTOMOBILE
VEHICLE SUSPENSION
Filed June 19, 1967
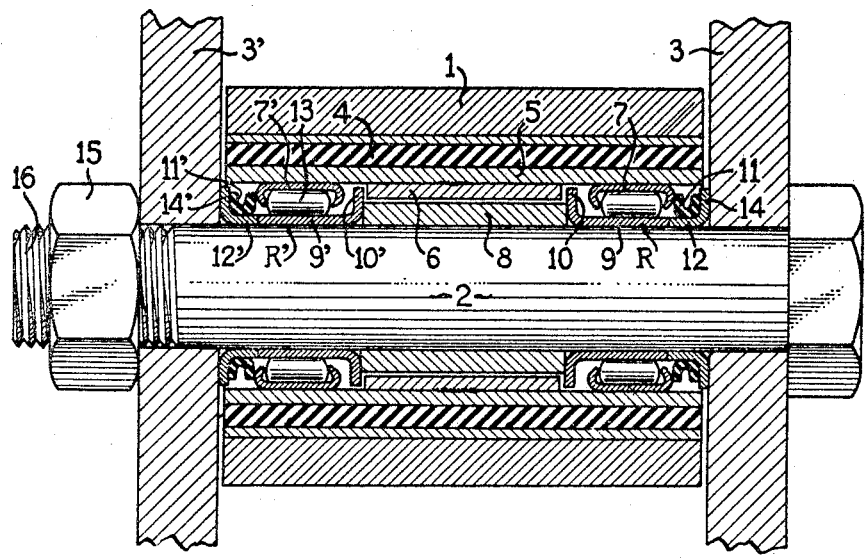

United States Patent Office 3,431,035
Patented Mar. 4, 1969

3,431,035
FLEXIBLE BEARING IN PARTICULAR FOR AN AUTOMOBILE VEHICLE SUSPENSION
Marcel Dangauthier, Paris, France, assignor to Societe Industrielle et Commerciale des Automobiles Peugot, Paris, France, a French body corporate
Filed June 19, 1967, Ser. No. 647,040
Claims priority, application France, June 21, 1966, 66,215
U.S. Cl. 308—184       3 Claims
Int. Cl. F16c 27/00

ABSTRACT OF THE DISCLOSURE

A flexible bearing incorporated in an arm of an automobile vehicle suspension and comprising two needle rolling bearings interposed between a rigid tubular element surrounded by a flexible sleeve and a spindle which is rotatable relative to said arm.

---

The present invention relates to flexible bearings of utility in particular in the suspension of automobile vehicles comprising inside a rigid tubular element surrounded by a flexible sleeve fixed to the element, needles constituting journal rolling elements interposed between the tubular element and an inner cylindrical member.

The object of the invention is to improve bearings of this type so as to achieve maximum bearing life with no particular maintenance being required. In the bearing according to the invention, the needles are part of two rolling bearings located in the vicinity of the respective ends of the tubular element.

As compared to the known bearings which comprise a single rolling bearing located in the middle of the tubular element, this arrangement results in a high moment of tailing in without excessive needle fatigue which enables maximum benefit to be gained of the flexible sleeve.

Each rolling bearing comprises preferably, in addition to an outer ring fitted inside the tubular element, an inner ring adapted to be mounted on the inner cylindrical member. This avoids subjecting the latter to a hardening treatment which would be necessary if the needles rolled directly thereon.

According to another feature of the invention, each inner ring comprises a radial flank which is axially offset from the adjacent end of the outer ring towards the middle of the tubular element. These two radial flanks constitute support faces for an annular spacer member located towards the middle of and inside the tubular element and for an annular abutment member which is integral with the tubular element and disposed coaxially around the spacer member and has an axial dimension less than that of the spacer member. The faces for axially positioning the moving parts relative to each other are thus located in the median region of the tubular element, namely in the region thereof which is the most lubricated and protected.

This protection is the better as it is possible to provide at each of the axial ends of the flexible bearing a sealing ring interposed between the adjacent end of the corresponding outer ring of the corresponding rolling bearing and a second radial flank on the inner ring. This arrangement enables a maximum amount of lubricant to be employed.

The invention will be explained by way of illustration in the course of the ensuing description. In the accompanying drawing, given by way of example, the figure shows one application of the flexible bearing according to the invention.

The illustrated flexible bearing is interposed between a rotating member 1, which can be for example a suspension arm or the attachment of a damper of an automobile vehicle, and a spindle 2 which is fixed to a part of the chassis 3 and 3' of the vehicle. This flexible bearing comprises a flexible sleeve 4 and a tubular element 5 which is disposed in and made integral with the sleeve 4.

Secured in the median part of this tubular element is a tube 6 which is mounted with a tight interference or drive fit which may be if desired supplemented by some additional means, such as an adhesive or welding, so as to improve the fixing thereof to the tubular element 5.

This tube 6 may also be an integral part of the tubular element 5; the latter is then in the form of a thick tube with a counterbore at each end.

Disposed inside the tubular element 5 on each side of an annular spacer member 8 which has a radial clearance relative to the tube 6, are two rings 9 and 9'. Each of the latter comprises a radial flank 10, 10' which bears against the adjacent end of the spacer member 8 whose length is slightly greater than that of the tube 6 and which allows a relative rotation between the flanks 10, 10' and the radial flanks of the tube 6. Mounted inside the tubular element 5 by means of a press on each side of the tube 6, of the spacer member 8 and of the radial flanks of the rings 9 and 9' are two needle bearing rings 7 and 7' so that the needles 13 have as their inner race the cylindrical face of the rings 9 and 9'. The latter are extended by L-section collars 12, 12' whose radial flanges 14, 14' bear against the adjacent faces of the chassis members 3, 3'.

Sealing rings 11, 11' are disposed between the flanges 14, 14' and the adjacent radial edges of the rings 7, 7'.

Both ends of the tubular element 5 are thus provided with needle rolling bearings R, R' having an incorporated seal in respect of which bearings the rings 7, 7' and the adjoining rings 9, 12 and 9', 12' constitute the outer and inner bearing rings.

After the various elements of the bearings are placed in position in the element 1, the assembly can be inserted between the opposite faces of the chassis elements 3, 3' after which the spindle 2 is introduced into the assembly comprising the elements 8, 9, 12, 9', 12'. The clamping by means of the nut 15 screwed on the screwthread 16 finally produces an axial stress in the elements 8, 9, 12, 9', 12' which ensures a given distance between the chassis members 3 and 3' and precludes contact of these members with the tubular element 5.

Inside the tubular element 5 the tube 6 integral therewith has its movements limited by the radial flanks 10 and 10' with a given play so that the position of the element 1 relative to the chassis 3, 3' is determined with a precision which depends on the difference between the dimensions of the tube 6 and spacer member 8 and on the axial elasticity of the flexible sleeve 4.

Although a specific embodiment of the invention has been described, many modifications and changes may be made therein without departing from the scope of the invention as defined in the appended claims.

Thus, the rings 9 and 12 and the rings 9' and 12' can be in one piece. In this case, the flanges 14, 14' are eliminated and the axial ends of the rings 9, 9' would come in direct contact with the faces of the chassis members 3, 3', the sealing rings 11, 11' being themselves applied against these members.

In the illustrated embodiment, the axial dimension of the spacer member 8 and of the tube 6 which constitutes an axial abutment exceeds that of the two rings 9, 12 and 9', 12'. It is obvious that the opposite arrangement could be adopted, the tube 6 being in the extreme case a simple abutment washer.

Having now described my invention what I claim as new and desire to secure by Letters Patent is:

1. A flexible bearing, in particular for an automobile vehicle suspension, said bearing comprising a rigid tubular element, a flexible sleeve encompassing and fixed to the tubular element, an inner cylindrical member within the tubular element, two journal rolling bearings respectively interposed between the cylindrical inner member and end portions of the tubular element, each rolling bearing comprising an outer ring mounted in the tubular element, an inner ring mounted on the inner member and needles interposed between the inner and outer rings, each inner ring of each rolling bearing comprising a radial flank which is axially offset axially inwardly of the tubular element relative to the adjacent end of the corresponding outer ring and an annular spacer member located between the roller bearings and inside the tubular element, said radial flanks of the inner rings constituting support faces for the spacer member, an annular abutment means integral with the tubular element and disposed coaxially around the spacer member and having an axial extent less than that of the spacer member, said radial flanks constituting support faces for the abutment means.

2. A bearing as claimed in claim 1, comprising a radial clearance between the spacer member and the abutment means.

3. A structure comprising, in combination, a first element, a second element having two spaced faces, a flexible bearing interposed between the first element and the second element for pivotally mounting the first element on the second element, said flexible bearing comprising a rigid tubular element, a flexible sleeve encompassing and fixed to the tubular element, an inner cylindrical member within the tubular element, two-journal rolling bearings respectively interposed between the cylindrical inner member and end portions of the tubullar element, each rolling bearing comprising an outer ring mounted in the tubular element, an inner ring mounted on the inner member and needles interposed between the inner and outer rings, each inner ring having a radial flank at each end thereof which is axially offset from the adjacent end of the corresponding outer ring, an annular spacer member within the tubular element and in abutting relation to the adjacent radial flanks of the inner rings, the radial flanks remote from the spacer member having outer faces spaced apart a distance greater than the axial extent of the tubular element, and means clamping said spaced faces of said second element axially against said outer faces of the radial flanks remote from the spacer member, said first element being mounted on said flexible sleeve.

References Cited

UNITED STATES PATENTS

| | | | |
|---|---|---|---|
| 2,188,862 | 1/1940 | Horger | 308—184 |
| 2,333,183 | 11/1943 | Jones | 367—543 |
| 3,112,141 | 11/1963 | Peras | 308—184 |

FOREIGN PATENTS

| | | |
|---|---|---|
| 923,760 | 2/1955 | Germany. |

MARTIN P. SCHWADRON, *Primary Examiner.*

FRANK SUSKO, *Assistant Examiner.*